A. V. MITCHELL.
Feed-Rack.
No. 159,601.  Patented Feb. 9, 1875.
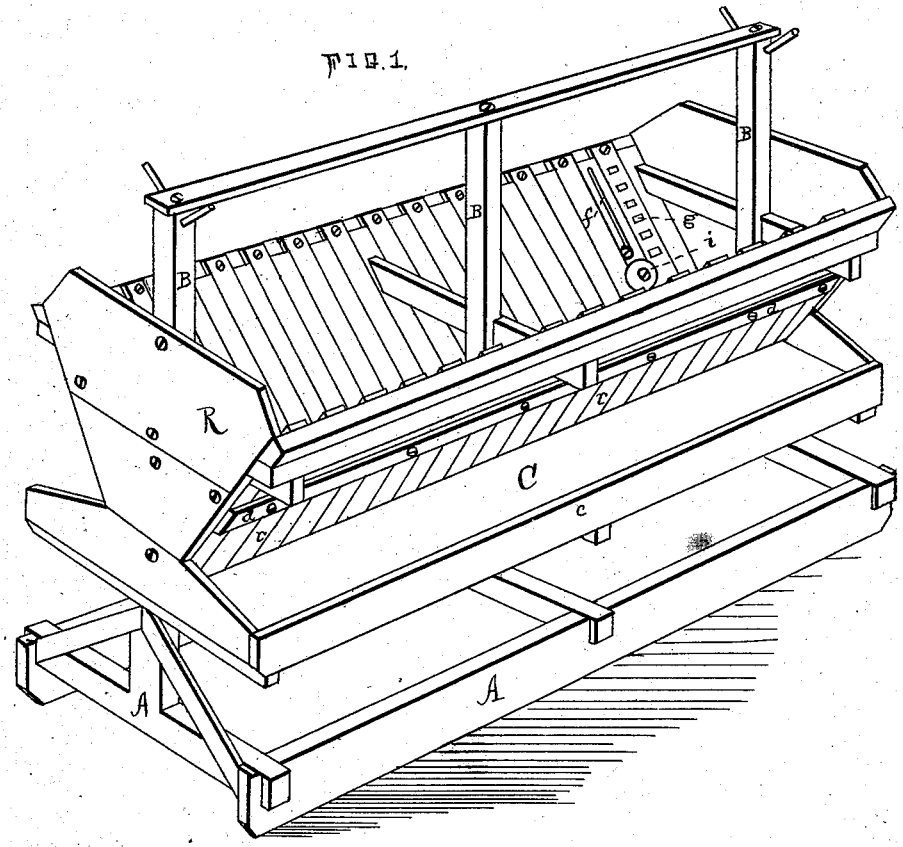
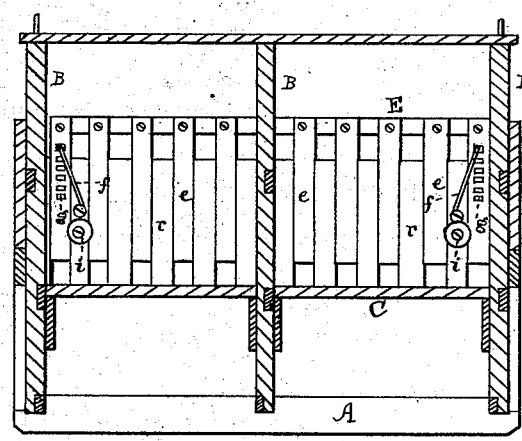
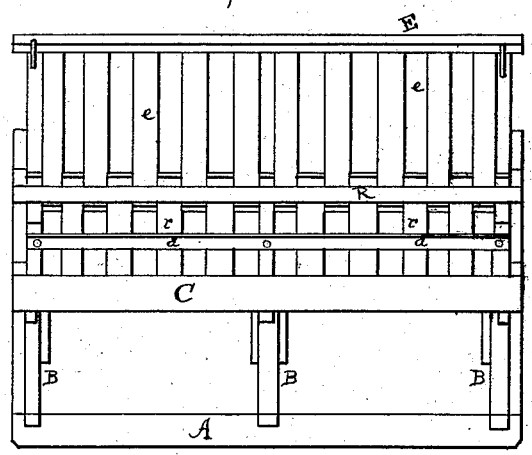
WITNESSES  
F. B. Townsend  
Will H. Moxon
INVENTOR  
Austin V. Mitchell  
per Atty's  
A. H. Evans & Co.

UNITED STATES PATENT OFFICE.

AUSTIN V. MITCHELL, OF LA SALLE COUNTY, ILLINOIS.

IMPROVEMENT IN FEED-RACKS.

Specification forming part of Letters Patent No. 159,601, dated February 9, 1875; application filed December 19, 1874.

*To all whom it may concern:*

Be it known that I, AUSTIN V. MITCHELL, of La Salle county and State of Illinois, have invented a new and useful Improvement in Feed-Racks, of which the following is a clear, full, and exact description, reference being had to the accompanying drawings, making a part of this specification, in which—

Figure 1 is a perspective view. Fig. 2 is a longitudinal section with the comb partially raised. Fig. 3 is a side view with combs thrown above.

My invention relates to portable or stationary racks and tables for feeding cattle and horses, and has for its object the saving of provender and time in feeding, and the preservation of the health of the stock fed; and it consists in the combination of devices, hereinafter described and explained.

To enable others to make and use my invention, I will proceed to describe the particular manner in which I have carried it out.

In the drawings, A A represent the foundation frame-work, from which rise the vertical posts B B B. At a convenient distance from the ground is constructed the table C, with its raised edges *c* to catch and hold the provender which may be wasted from the rack, thus preventing loss of provender, as the stock will continue to eat as long as their food remains clean, and will lick from the table what happens to drop thereon. The rack R is constructed of the inclined slats *r r*, secured to the horizontal slats *d d* at a distance about equal to their own width, as shown in Fig. 3, and the whole are secured together by proper studding and cross-ties to make the structure sufficiently firm. The ends are made of solid boarding. The combs E are constructed of slats *e e*, similar in size and width to the slats *d d*, and are secured to a horizontal slat in such a manner as to alternate with the slats forming the rack, between which they readily slide, as shown in Fig. 2. When the combs are in position, as shown in Fig. 1, the sides of the rack are virtually closed. On the inner side of the rack are the spring-catches *f f*, and on the adjoining slat of each comb are notches *g g*.

When it is desired to raise the comb for the purpose of feeding stock, it is only necessary to raise it as far as desired, when the spring-catch, acting as a pawl, engages with one of the notches, and the comb is held in position. The bottom *i* on the inner side of the rack acts to hold the comb in place while sliding up or down.

The operation of my invention is as follows: If ear-corn is to be fed to stock, throw into the rack any desired quantity, and then raise the sliding comb sufficiently high to allow the stock to reach it. After two days raise the comb another notch, and so on. If feeding corn with the husk on, the comb will have to be raised reasonably higher. If feeding pumpkins, beets, turnips, or potatoes, the comb is raised as if feeding corn. When feeding chopped straw, clover-hay, or other similar food, the comb should be raised to last notch; but when feeding fodder or stalks with the ears of corn on, the combs should be withdrawn and hung on the hooks at the top of the vertical posts, as shown in Fig. 3. This leaves the rack entirely open, and secures the provender at the top.

The rack is usually constructed large enough to hold corn for fifteen head of cattle for one week; but it can be made of any size desired. It may also be made stationary by sinking the posts B B into the ground, and avoiding the use of the foundation-frame.

It is a well-known fact that cattle cannot be fed with safety among hogs. The cattle are liable to many diseases when thus fed. Hogs, however, can feed with impunity after other stock.

It is evident, from the foregoing description of my invention, that there is no danger to cattle thus fed, while all the food which may be wasted from the rack and table will be gathered and eaten by the hogs.

Having thus described my invention, what I claim as new, and desire to secure by Letters Patent, is—

A feed-rack for cattle and horses, constructed as described, and consisting essentially of the exterior table C, in combination with the inclined rack, provided with the spring-catches *f f*, and the comb E, having the notches *g g*, substantially as described.

AUSTIN V. MITCHELL.

Witnesses:
J. M. JOHNSON,
A. R. JOHNSON.